US012715100B2

(12) United States Patent
Carlsson

(10) Patent No.: US 12,715,100 B2
(45) Date of Patent: Aug. 25, 2026

(54) WIRELESS CONTROL OF AUXILIARY EQUIPMENT

(71) Applicant: HUSQVARNA AB, Huskvarna (SE)

(72) Inventor: Par Carlsson, Hyssna (SE)

(73) Assignee: HUSQVARNA AB, Huskvarna (SE)

( * ) Notice: Subject to any disclaimer, the term of this patent is extended or adjusted under 35 U.S.C. 154(b) by 0 days.

(21) Appl. No.: 19/118,137

(22) PCT Filed: Sep. 28, 2023

(86) PCT No.: PCT/EP2023/076950

§ 371 (c)(1),
(2) Date: Apr. 3, 2025

(87) PCT Pub. No.: WO2024/074404

PCT Pub. Date: Apr. 11, 2024

(65) Prior Publication Data

US 2026/0124733 A1 May 7, 2026

(30) Foreign Application Priority Data

Oct. 3, 2022 (SE) .................................... 2251143-0

(51) Int. Cl.
*B25F 5/02* (2006.01)
*B28D 7/02* (2006.01)
(Continued)

(52) U.S. Cl.
CPC .................. *B25F 5/02* (2013.01); *B28D 7/02* (2013.01); *H01H 9/20* (2013.01); *B28D 1/045* (2013.01)

(58) Field of Classification Search
CPC .... B25F 5/00; B25F 5/02; H01H 9/06; H01H 3/20; B23D 45/16; B23D 47/12; B23D 59/02
See application file for complete search history.

(56) References Cited

U.S. PATENT DOCUMENTS 3,847,233 A 11/1974 Glover et al.
6,588,112 B2 7/2003 Zeiler et al.
(Continued)

FOREIGN PATENT DOCUMENTS

EP 3505034 A1 7/2019
EP 4052855 A1 9/2022
(Continued)

OTHER PUBLICATIONS

International Search Report and Written Opinion for International Application No. PCT/EP2023/076950 mailed Dec. 15, 2023.
(Continued)

*Primary Examiner* — Nathaniel C Chukwurah
(74) *Attorney, Agent, or Firm* — Burr & Forman

(57) ABSTRACT

Hand-held construction equipment (100) comprising a trigger (110) arranged to activate the equipment (100) in response to actuation by a user, a trigger lockout arrangement (120) having a locked state and a released state, where the trigger lockout arrangement (120) is arranged to prevent activation of the construction equipment by the user when in the locked state, and a control unit (150) comprising a communications module arranged to communicate wirelessly (170) with auxiliary equipment, where the control unit (150) is arranged to transmit a wireless activation signal by the communications module to the auxiliary equipment in response to the trigger lockout arrangement (120) entering into the released state or in response to the trigger lockout arrangement (120) entering into the released state and remaining in the released state for a predetermined period of time.

20 Claims, 2 Drawing Sheets

(51) Int. Cl.
*H01H 9/20* (2006.01)
*B28D 1/04* (2006.01)

(56) References Cited

U.S. PATENT DOCUMENTS

| | | | | |
|---|---|---|---|---|
| 9,656,336 | B2 * | 5/2017 | Petersson | B28D 7/02 |
| 2006/0260453 | A1 * | 11/2006 | Layher | F16K 7/065 137/560 |
| 2011/0239398 | A1 | 10/2011 | Furusawa et al. | |
| 2013/0277189 | A1 | 10/2013 | Yuan et al. | |
| 2019/0011892 | A1 | 1/2019 | Post et al. | |
| 2020/0146520 | A1 * | 5/2020 | Caspar | A47L 7/0095 |
| 2020/0266690 | A1 | 8/2020 | Agne et al. | |

FOREIGN PATENT DOCUMENTS

| | | | |
|---|---|---|---|
| JP | H03128625 | A | 5/1991 |
| WO | 2013/187837 | A2 | 12/2013 |

OTHER PUBLICATIONS

Swedish Search Report and Office Action for Application No. 2251143-0 mailed Apr. 27, 2023.

* cited by examiner

WIRELESS CONTROL OF AUXILIARY EQUIPMENT

TECHNICAL FIELD

The present disclosure relates to hand-held construction equipment, such as cut-off tools for cutting concrete and stone. There are disclosed methods and arrangements for controlling auxiliary devices connected to the construction equipment.

BACKGROUND

Hand-held construction equipment such as cut-off tools, also known as power cutters, and other work implements are commonly seen on construction work sites, where they are used for various tasks. Such tools can be supplemented by auxiliary equipment in order to add functionality to the tool. A cut-off tool used for abrasive processing of concrete can, for instance, be connected to a water tank with an integrated pump which supplies water in support of the concrete processing operation. A dust extractor can also be connected to construction equipment that generate dust during operation, such as a floor grinder, in order to capture the generated dust in a safe manner.

Some auxiliary devices are battery powered, which means that there is a desire to reduce power consumption by the auxiliary devices, in order not to prematurely deplete the battery.

There is a need for improved methods of communication between construction equipment and auxiliary equipment.

SUMMARY

It is an objective of the present disclosure to provide improved hand-held construction equipment. This objective is obtained by hand-held construction equipment comprising a trigger arranged to activate the equipment in response to actuation by a user and a trigger lockout arrangement having a locked state and a released state, where the trigger lockout arrangement is arranged to prevent activation of the construction equipment, i.e., prevent actuation of the trigger by the user, when in the locked state. The hand-held construction equipment also comprises a control unit with a communications module arranged to communicate wirelessly with auxiliary equipment. The control unit is arranged to transmit a wireless activation signal by the communications module to the auxiliary equipment in response to the trigger lockout arrangement entering into the released state or in response to the trigger lockout arrangement entering into the released state and remaining in the released state for a predetermined period of time. This way the trigger lockout mechanism is re-used as actuator for activating auxiliary equipment in an efficient manner. The auxiliary equipment used in combination with a given work tool can thus be changed in a convenient manner, since the wireless activation signal is not fixedly associated with specific auxiliary equipment. In other words, the wireless activation signal generated in this manner can be used to activate several different types of auxiliary equipment, which simplifies reconfiguration of the work tool set-up at the work site. A certain cut-off tool may be used together with a water tank and pump that is activated by the wireless activation signal for a first work task, and later on together with a dust extractor instead of the water tank for a second work task after a straightforward reconfiguration of the association between the wireless activation signal and the auxiliary equipment.

For most auxiliary devices, the wireless activation signal is preferably transmitted immediately in response to the trigger lockout arrangement entering into the released state in order to activate the auxiliary device with minimum delay. However, in some cases a small delay in-between actuation of the trigger lockout arrangement and transmission of the wireless activation signal can be useful in order to, e.g., avoid inadvertent activation of the auxiliary equipment. It is an advantage to use the trigger lockout mechanism for this purpose since it is normally actuated some time before the trigger is depressed to activate the main operation of the equipment. This leaves some time for the auxiliary equipment to power up before the construction equipment is started, so that full functionality is obtained when the construction equipment is put to use. For instance, in case the auxiliary equipment is a water tank with a pump and a control unit arranged to activate the pump in response to receiving the wireless activation signal, the water will have some time to reach the tool before it is energized. The same is true for the case where the auxiliary equipment is a dust extractor with a control unit arranged to activate the dust extractor in response to receiving the wireless activation signal. The dust extractor may need some time in order to reach full suction performance, and it is therefore advantageous that the trigger lockout mechanism is actuated some short time before a trigger on the dust generating construction equipment is depressed. Two or more pieces of auxiliary equipment can also be connected to the construction equipment and jointly actuated by means of the trigger lockout function on the construction equipment. The techniques disclosed herein are applicable with electrically powered construction equipment as well as with combustion engine powered equipment and also hydraulic equipment.

The trigger is, according to an example, a trigger on a cut-off tool (also known as a power cutter). The trigger lockout arrangement then comprises a button arranged to be actuated by the palm of a user gripping a rear handle of the cut-off tool. This location makes it easy to actuate the trigger lockout mechanism to assess connectivity of the wireless link to the auxiliary equipment and the also the functionality of the auxiliary equipment.

According to some aspects, the control unit is also arranged to transmit a wireless deactivation signal by the communications module to the auxiliary equipment in response to the trigger lockout arrangement entering into the locked state, optionally with some delay, thereby stopping the auxiliar equipment when it is no longer needed. This way the on-time of the auxiliary equipment can be reduced to conserve energy, which is especially advantageous if the auxiliary equipment is battery powered. It may be preferred to add a delay before transmitting the deactivation signal, such that the trigger lockout arrangement can temporarily enter into the locked state without deactivating the auxiliary equipment. The delay may, e.g., be in the order of a second or so. A user can then temporarily deactivate the construction equipment and quickly turn it back on again without the auxiliary equipment being deactivated.

The released state of the trigger lockout arrangement may in some cases comprise a first position and a second position. The control unit can then be arranged to transmit the wireless activation signal in response to the trigger lockout arrangement entering into the first position of the released state or in response to the trigger lockout arrangement entering into the first position of the released state and remaining in the released state for a predetermined period of time. The control unit can also be arranged to allow transition by the trigger lockout arrangement into the second position of the released state in response to receiving an acknowledgement signal from the auxiliary equipment, where the trigger lockout arrangement is configured to prevent activation of the construction equipment, i.e., prevent actuation of the trigger by the user, in the first position of the released state and to allow actuation of the trigger in the second position of the released state. With this function in place, the control unit will prevent use of the construction equipment until an acknowledgement signal has been received from the auxiliary equipment, indicating, e.g., that the water pressure has been activated and/or that the dust extractor has started up. The function can also be used, e.g., to prevent use of a power cutter unless an air cleaner or the like has been successfully activated. The control unit may alternatively only have a release state with a single position. In this case the control unit may be configured to only actuation of the trigger by the user if an acknowledgement signal is received in response to transmitting the wireless activation signal.

According to some aspects, the control unit is arranged to control a user interface of the construction equipment to indicate by the user interface if the trigger lockout arrangement is in the locked state or in the released state, e.g., by a green and red light or the like. This allows a user to conveniently understand what the current state of the control unit is, and also that the trigger lockout mechanism functions as intended. This user interface can also be used to communicate a status of the auxiliary equipment, such as if the auxiliary equipment has responded to the wireless activation signal by activating the auxiliary equipment supporting functions.

According to some other aspects, the control unit is associated with a paired state and an unpaired state with respect to the auxiliary equipment. The control unit, when in the unpaired state, can then be arranged to perform a pairing operation in response to the trigger lockout arrangement entering into the released state or in response to the trigger lockout arrangement entering into the released state and remaining in the released state for a predetermined period of time. Thus, the trigger lockout mechanism is used for yet another purpose, that of pairing the construction equipment wirelessly to one or more pieces of auxiliary equipment. The control unit, when in the paired state, may address the wireless signal to a specific piece of auxiliary equipment, or to a specific group of auxiliary devices. For instance, suppose that a control unit on some type of construction equipment is not associated with any auxiliary equipment, i.e., is not logically linked to any auxiliary equipment, and that the trigger lockout arrangement is released. This event can then be used to trigger a search for nearby auxiliary equipment, such that an association or pairing can be performed between the construction equipment and the auxiliary equipment nearby. An acknowledgement on the construction equipment and/or on the auxiliary equipment can be required in order to avoid inadvertent pairing of devices.

The control unit 150 is optionally also arranged to respond to a repeated actuation of the trigger lockout arrangement 120 within a time period, by performing a pre-determined function. This repeated actuation can, e.g., be a double-click actuation or a triple-click actuation of the trigger lockout arrangement 120, where a user presses the trigger lockout device repeatedly two or three times within a relatively short time window, such as a time window of two or three seconds. The pre-determined function can for instance be an un-pairing operation where a logical link to one or more auxiliary devices is removed, or a test routine configured to test wireless connectivity to the auxiliary device and function thereof.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. Further features of, and advantages with, the present invention will become apparent when studying the appended claims and the following description. The skilled person realizes that different features of the present invention may be combined to create embodiments other than those described in the following, without departing from the scope of the present invention.

BRIEF DESCRIPTION OF THE DRAWINGS

The present disclosure will now be described in more detail with reference to the appended drawings, where.

DETAILED DESCRIPTION

Figure 1:
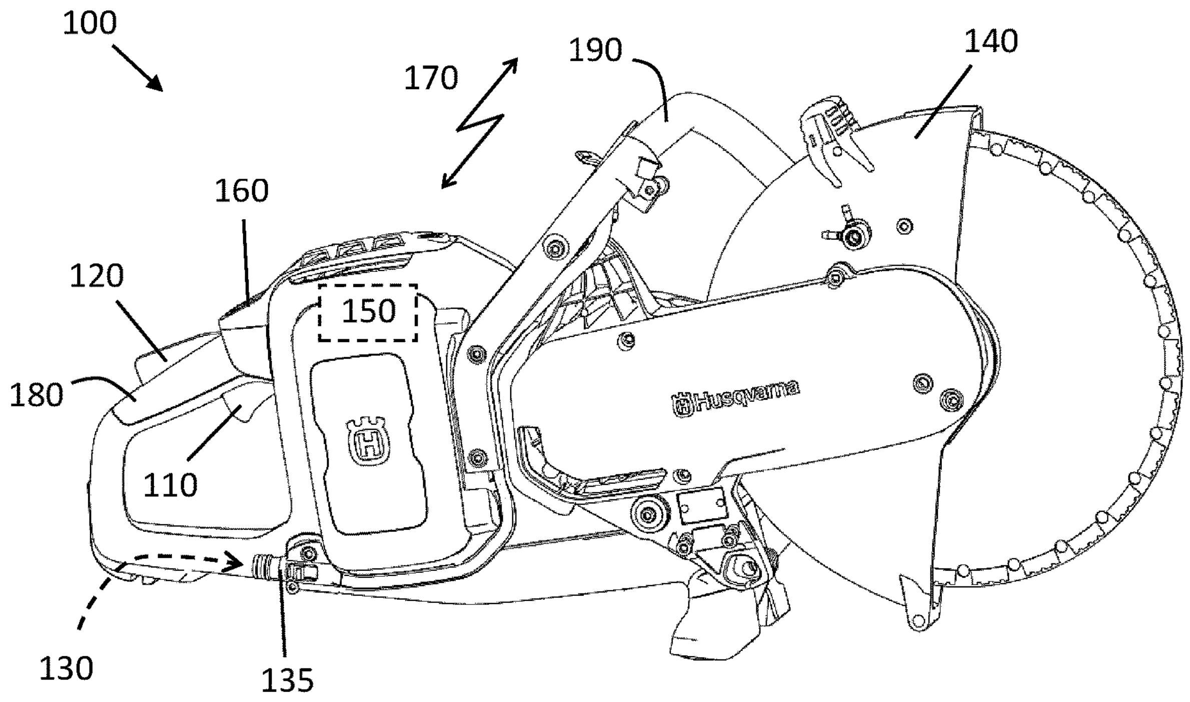
FIG. 1 shows an example of an electrically powered cut-off tool.

The invention will now be described more fully hereinafter with reference to the accompanying drawings, in which certain aspects of the invention are shown. This invention may, however, be embodied in many different forms and should not be construed as limited to the embodiments and aspects set forth herein; rather, these embodiments are provided by way of example so that this disclosure will be thorough and complete, and will fully convey the scope of the invention to those skilled in the art. Like numbers refer to like elements throughout the description.

It is to be understood that the present invention is not limited to the embodiments described herein and illustrated in the drawings; rather, the skilled person will recognize that many changes and modifications may be made within the scope of the appended claims.

FIG. 1 shows an example of construction equipment 100. The device is a hand-held electrically powered cut-off tool 100 (also known as a power cutter) for cutting into hard materials such as concrete and stone. The tool 100 comprises a rotatable circular cutting disc, which may also be referred to as a cutting blade, mounted on a supporting arm. A trigger 110 activates the cutting blade in a known manner. In order to avoid accidental activation of the machine 100, a trigger lockout arrangement 120 is located in connection to the trigger 110. An operator has to actuate this trigger lockout arrangement 120 before the trigger 110 can be depressed to bring the cutting blade into rotation. In this example a user gripping the rear handle 180 depresses the lockout mechanism by the palm of the hand, which releases a locking mechanism engaging the trigger 110, such that the trigger can be depressed by a finger on the same hand. This type of trigger lock-out mechanism is sometimes referred to as a palm lock device. Lockout mechanisms located on the front handle 190 are also known. A palm lock trigger lock-out mechanism may be realized by a Hall sensor arrangement comprising a magnet arranged on the moving part (the button) and a Hall sensor arranged on the fixed part (in this case normally the handle). Other types of lockout mechanisms comprise proximity sensors and contact sensors, which detect when a user holds the tool in a desired manner and prevents operation in case the user does not hold the tool in a desired manner.

The trigger lock-out arrangement 120 illustrated in FIG. 1 comprises a button or switch which is located on the opposite side of the rear handle 180 compared to the trigger 110, where it is arranged to be actuated by the palm of a user gripping the rear handle 180. Other types of trigger lock-out mechanisms are also known, such as buttons and levers that must be moved into an unlocked state before the trigger button can be actuated. Generally, a trigger lock-out arrangement is a mechanism that must be actuated by a user before a primary trigger can be actuated to activate the construction equipment. The trigger lock-out may be actuated by the same hand as the trigger or by the other hand of a user of the construction equipment. Trigger lockout devices of this kind are generally known and will therefore not be discussed in more detail herein.

One type of trigger lockout arrangement which can be used with the herein discussed techniques are the so-called dissimilar action type of trigger lock-out mechanisms. A dissimilar action trigger lock-out mechanism, may, e.g., comprise a palm lockout which requires the user to push a button in a forward or reverse direction before it can be depressed. Dissimilar action trigger lockout mechanism comprising buttons which require the user to push them in a direction other than the trigger button are also known.

In order to reduce the amount of dust released into the ambient environment during use of the cut-off tool 100, water is normally dispensed in connection to the cutting blade in use. This water may also increase the cutting performance of some abrasive cutting discs used for processing concrete. The machine 100 is arranged to receive a flow of water 130 via the water hose connector 135. The water is then guided from the connector 135 to one or more nozzles arranged in connection to the cutting blade, in this case under the blade guard 140.

The machine 100 also comprises an electronic control unit 150 arranged to control various functions on the machine, such as activating the motor to drive the cutting blade and communicating with a user via a user interface 160. The control unit 150 is connected to or comprises a communications module arranged to transmit and to receive information via wireless signals 170.

The communication module may comprise, e.g., an infrared transceiver or a radio transceiver. The radio transceiver may implement one or more communication standards, for instance one or more versions of the 802.11 Wi-Fi system, a cellular communications system such as 4G or 5G, or a Bluetooth system. It is appreciated that the teachings herein are not limited to any particular radio or infra-red standard, and does not rely on any protocol specific functions of the wireless communications system, other than said general information transmission and reception. Communication modules are generally known and will therefore not be discussed in more detail herein.

Lockout mechanisms 120 similar to that exemplified in FIG. 1 are found also on other hand-held machines. The teachings herein are generally applicable in the field of hand-held construction equipment, and not limited to cut-off tools of the kind shown in FIG. 1. The disclosed methods and techniques may, for instance, be applied also in hand-held chainsaws and other hand-held work implements that interface in one way or another with auxiliary devices.

Figure 2:
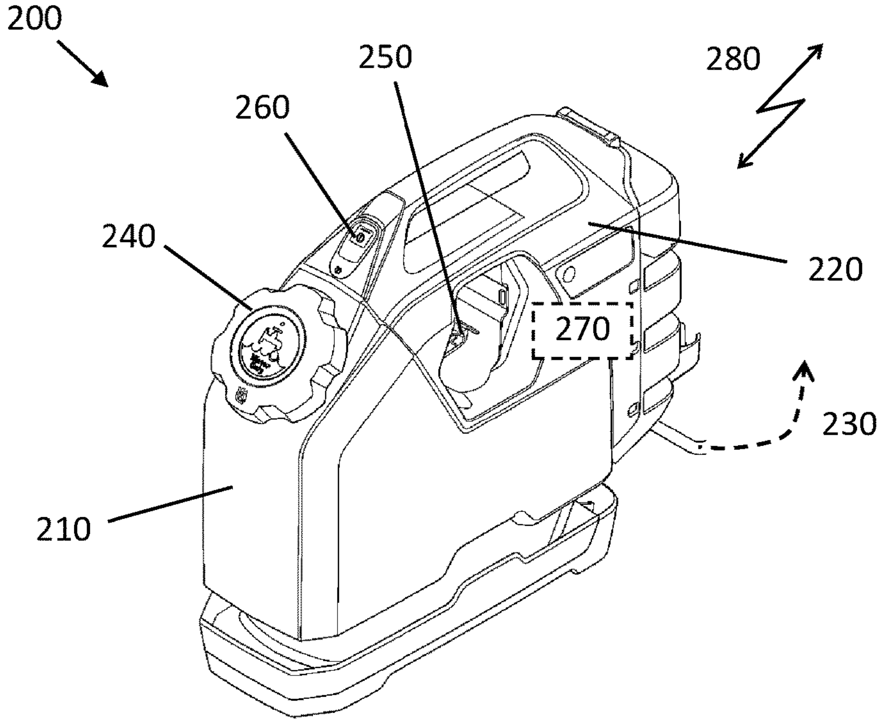
FIG. 2 illustrates example auxiliary equipment.

FIG. 2 illustrates example auxiliary equipment 200, in this case a water tank 210 with an integrated pump 220 arranged to generate a flow of water 230 through a water hose. The water tank is arranged to be filled with water via the tank opening 240 and carried out to the work site, where it can be connected to construction equipment such as the cut-off tool 100. This particular example water tank is arranged to receive a battery in a battery slot 250 to power the pump, but water tanks powered by cable from electrical mains are also known. A user may activate the pump and control other functions of the water tank via a user interface 260. Since the water tank is battery powered, it is desired to minimize the on-time of the device.

The auxiliary equipment 200 discussed herein generally comprises a control unit 270 arranged to control various functions on the device, such as activation and deactivation of the pump 220 to start and stop the flow of water 230. This control unit 270 also comprises a communications module arranged to communicate via wireless link 280, e.g., to the control unit 150 of the cut-off tool 100. Thus, the communication module of the construction equipment 100 and the communication module of the auxiliary device 200 are arranged to communicate with each other by transmission and reception of wireless signals 170, 280.

Figure 3:
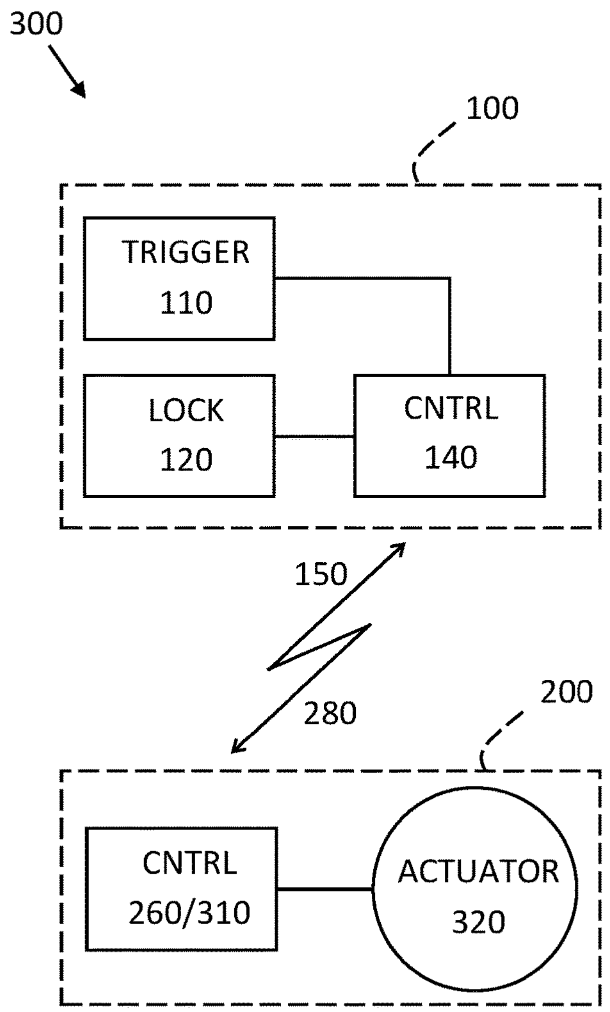
FIG. 3 schematically illustrates a wireless control system.

FIG. 3 schematically illustrates a system 300 comprising hand-held construction equipment 100 and auxiliary equipment 200, such as a water tank with a pump, a dust extractor, or some other type of equipment that is arranged to be used in combination with the construction equipment 100. An air cleaner can also be comprised in the auxiliary equipment configured to supplement hand-held construction equipment. A control unit 260, 310, can activate the auxiliary equipment whereupon it is placed in an operation mode that consumes more power compared to an inactivate mode of operation, such as a stand-by mode of operation or a mode where the device is turned off.

The construction equipment 100 comprises a trigger 110 arranged to activate the equipment 100 in response to actuation by a user, and a trigger lockout arrangement 120 having a locked state and a released state. The trigger lockout arrangement 120 is arranged to prevent activation of the construction equipment, i.e., prevent actuation of the trigger 110 by the user, when in the locked state, thus preventing a user from inadvertently activating the construction machine.

This prevention mechanism can be realized in many different ways. According to one example the lockout mechanism is a purely mechanical device which prevents the trigger 110 from being depressed unless the lockout device is also depressed simultaneously. According to another example the lockout arrangement 120 is an electronic arrangement which senses if a user desires to place the lockout mechanism in the released state, e.g., by a sensor connected to a button or by some form of proximity sensor such as a capacitive sensor configured to detect when a user places a palm on the rear handle 180 and/or on the front handle 190. The electronic lockout mechanism may actuate a solenoid device or the like in order to mechanically prevent the trigger from being actuated, or it can send an electronic release signal to the control unit which will then only react to a signal from the trigger if it also receives the electronic release signal. In other words, it is appreciated that activation of the construction equipment can be prevented either by mechanically preventing the trigger from being depressed by a user, or by disconnecting the trigger somehow from the rest of the construction equipment such that movement by the trigger does not result in activation of the construction equipment. The trigger lock-out arrangement 120 is preferably based on the principles of dissimilar action, i.e., an action by a user which is different from the action required to activate the construction equipment 100.

With reference to FIG. 1, the construction equipment 100 also comprises a control unit 150 comprising a communications module arranged to communicate wirelessly 170 with the auxiliary equipment 200, by transmitting a wireless activation signal to the auxiliary equipment 200 in response to the trigger lockout arrangement 120 entering into the released state, i.e., in response to the lockout arrangement leaving the locked state where trigger actuation is prevented. Thus, as soon as a user engages the lockout mechanism to place it in the released state, the control unit transmits the wireless activation signal to the auxiliary equipment 200. According to some aspects this activation signal is addressed to a specific auxiliary device, e.g., by means of a device specific address or the like. Alternatively, the activation signal is a general activation signal which is received by any auxiliary device (possibly of the right kind) in the vicinity of the construction equipment 100. In some cases the construction equipment is in a paired mode with one or more auxiliary devices. This means that there is a logical association between the different devices, and that the wireless signal is addressed specifically to a given auxiliary device, e.g., by means of addressing the transmitted wireless signal, or by using a specific signal format to transmit the wireless signal, such as a specific frequency that the auxiliary device has been configured to listen to. This type of pairing is generally known and will therefore not be discussed in more detail herein.

It is an advantage that the wireless activation signal can be used to activate more than one type of auxiliary equipment, i.e., that the arrangement can be used to control many different types of auxiliary equipment, and also more than one type of auxiliary equipment at the same time. This is an important difference compared to traditional mechanical arrangements for triggering auxiliary equipment. WO 2013/187837 A2, for instance, discloses electrically powered construction equipment comprising an elaborate on-board cooling fluid system which both cools the motor and prevents dust from spreading into the environment. The cooling fluid system is activated by a trigger lockout arrangement which is mechanically linked to a fluid control unit integrated with the hand-held construction equipment. This auxiliary equipment activation mechanism can only be used for one purpose and for one type of auxiliary equipment. It cannot easily be repurposed for use with some other type of auxiliary equipment. By using a wireless activation signal in the manner described herein, a significant increase in versatility is obtained, which is an advantage.

In other words, it is appreciated that an important part of this disclosure is that a reconfigurable association, i.e., a reconfigurable logical link, may be formed between the control unit 150 and a given piece of auxiliary equipment 200 (or between the communications module of the control unit and a corresponding communications module of the auxiliary equipment 200. This reconfigurable association is not permanent but reconfigurable based on the requirements of the work task at hand. The control unit 150 and/or the communications module of the control unit is arranged for this type of reconfiguration of the association between the construction equipment and different auxiliary equipment.

To summarize, the control units 150 discussed herein are arranged to form an association with auxiliary equipment prior to transmitting the wireless activation signal, by the communications module, to the auxiliary equipment 200 in response to the trigger lockout arrangement 120 entering into the released state or in response to the trigger lockout arrangement 120 entering into the released state and remaining in the released state for a predetermined period of time. The association between control unit and auxiliary equipment may be defined by manual configuration at the construction site, e.g., by a user inputting device data to identify the auxiliary equipment and/or the construction equipment at the construction equipment and/or at the auxiliary equipment in order to form the association. The association between control unit and auxiliary equipment may also be formed using a pairing operation, which will be discussed in more detail below.

It is noted that some delay can also be used in between actuation of the trigger lockout arrangement and transmission of the wireless activation signal, such that the activation signal is transmitted some small time pre-determined period after actuation of the trigger lock-out mechanism. This could, for instance, be useful in order to limit unintentional activation of an auxiliary device. The delay can, e.g., be somewhere from 0.5-2 seconds or so. This delay can optionally be used with all functions discussed herein that are in some way triggered by actuation of the trigger lock-out mechanism 120. The time period of the delay can be pre-configured by the control unit and can be different for the different operations. This added delay may be configured by a user, optionally along with the time duration of the delay.

The control unit may be associated with a paired state and an unpaired state. In the paired state there is a logical link or association between the control unit and one or more auxiliary devices, such as a water tank or dust extractor, while, in the unpaired state no such logical link or association exists. The trigger lockout arrangement can also be used for pairing. The control unit can for instance, when in the unpaired state, be arranged to perform a pairing operation in response to the trigger lockout arrangement entering into the released state. Alternatively, the pairing operation can be triggered after some delay, i.e., in response to the trigger lockout arrangement entering into the released state and remaining in the released state for a predetermined period of time, which time period can be pre-configured in the control unit to a value, e.g., on the order of a few seconds or so. In this case an operator can create an association between the construction equipment 100 and an auxiliary device by actuating the trigger lockout arrangement 120 while, e.g., holding down a pairing button or the like on the auxiliary equipment. This operation then creates the above-mentioned association between the construction equipment 100 and the auxiliary device, placing them in a paired state. The association between the construction equipment 100 and the auxiliary equipment 200 can be tested in a convenient manner by actuating the trigger lockout mechanism after the pairing operation has been performed.

It is once-more noted that some delay can be used in between actuation of the trigger lockout arrangement and start of the pairing operation by the control unit. It is appreciated that the construction equipment can be paired with one or more auxiliary devices, and that the pairing operation supports pairing with more than one device, either at the same time or at different time instants. The pairing operation may comprise a discovery procedure in a known manner, where the control unit searches for nearby auxiliary devices that are also executing a pairing procedure.

The auxiliary equipment 200, having received the activation signal from the construction equipment 100 by an on-board control unit 310, activates one or more actuators on the auxiliary equipment, such as starting up a water pump to deliver a flow of water 230 to the construction equipment 100, or starting up a dust extractor to extract dust generated when the construction equipment is in use. It is a particular advantage that the lockout mechanism is used to activate auxiliary equipment via a wireless signal in this manner, since there will be a short delay from the time of placing the lockout arrangement in the released state to triggering the operation of the construction equipment, i.e., energizing the motor of a cut-off tool or chain saw. This small delay from release of the lockout mechanism to actuation of the trigger by the user allows the wireless signal to be generated, transmitted from the construction equipment control unit 140, received at the auxiliary device control unit 260, 310, as well as activation of the actuator or actuators 320 of the auxiliary device. It is a further advantage that the lockout mechanism is used for this purpose, since this button is already present on many machines already, and can be re-used for the purpose of wirelessly activating auxiliary equipment.

A user can also assess the connection to an auxiliary device and the function of the auxiliary device in a convenient manner by placing the lockout mechanism in the released state without, e.g., energizing the motor on the construction equipment, which is an advantage. According to some aspects, the control unit 150 can also be arranged to control a user interface 160 of the construction equipment 100 to indicate by the user interface 160 if the trigger lockout arrangement 120 is in the locked state or in the released state. In some cases the auxiliary device is also configured to respond to the activation signal by a wireless acknowledgement signal if all is in order, and perhaps also by some form of error signal is something has gone wrong. This information can of course also be presented to the user via the user interface 160.

The control unit 150 is optionally also arranged to transmit a wireless deactivation signal by the communications module to the auxiliary equipment 200 in response to the trigger lockout arrangement 120 entering into the locked state. In other words, once the user finishes using the construction equipment, and places the lockout mechanism back into its locked state (for instance by letting go of the rear handle 180 in FIG. 1), the control unit automatically inactivates the auxiliary equipment. This will conserve energy at the auxiliary device, which is particularly important in battery powered devices. Some auxiliary devices, such as dust extractors, may continue running for some time period before shutting down after having received the deactivation signal, so as not to stop operation prematurely, as could happen, e.g., if the auxiliar device is a dust extractor. A timer can be used for this purpose, for instance a timer function integrated in one of the control units. The timer can be arranged in the control unit 140 at the construction equipment side, or in the control unit 260, 310 at the auxiliary device side. In case the timer is located at the construction equipment side then the inactivation signal will be transmitted with a predetermined delay from the time instant the lockout mechanism enters back into the locked state.

Figure 4:
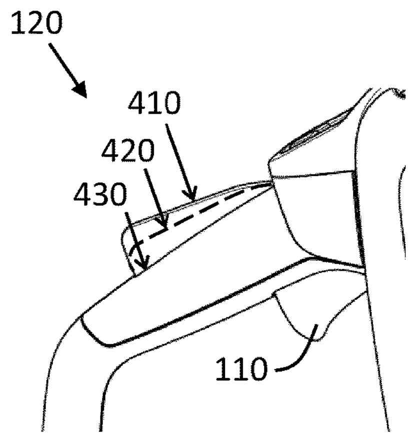
FIG. 4 shows an example lockout arrangement.

Some trigger lockout arrangements 120 are arranged to allow actuation of the trigger 110 by the user only when the lockout arrangement is in the released state. This means that the lockout mechanism only has two positions, either locked or released, where the trigger can be actuated when the lockout arrangement is in the released state and not when the lockout arrangement is in the locked state. However, in some lockout mechanisms, the released state of the trigger lockout arrangement 120 comprises a first position 420 and a second position 430. An example of this is illustrated in FIG. 4, where the lockout mechanism can be depressed halfway from a default position 410 to an intermediate position 420. The control unit 150 can then be arranged to transmit the wireless activation signal in response to the trigger lockout arrangement 120 entering into the first position 420 of the released state. The control unit 150 is then arranged to allow transition by the trigger lockout arrangement 120 into the second position 430 of the released state in response to receiving an acknowledgement signal from the auxiliary equipment 200. The trigger lockout arrangement 120 is configured to prevent activation of the construction equipment, i.e., prevent actuation of the trigger 110 by the user, in the first position 420 of the released state and to allow actuation of the trigger 110 in the second position 430 of the released state. In a practical example of this optional feature, with reference to FIG. 1, a user is initially only able to depress the lockout button halfway (to the first position 420), whereupon the control unit transmits the wireless activation signal to the auxiliary device. The lockout button is prevented from being depressed further from the first position, e.g., by a solenoid device controlled by the control unit, or by a servo device. Once the control unit 140 receives an acknowledgement signal from the auxiliary device 200, indicating that the wireless activation signal has been received properly and that the auxiliary device has been activated successfully, the control unit allows the lockout mechanism to enter into the second position 430 (fully depressed in FIG. 4), whereupon the trigger can be actuated. The wireless transmission procedure involving generation of the activation signal, transmission of the activation signal, reception of the activation signal, generation of the acknowledgement signal, and transmission of the acknowledgement signal is often relatively fast, i.e., on the order of ms, and therefore normally not noticeable by the user, unless the acknowledgement fails for some reason, in which case the construction equipment cannot be activated. This could, for instance, be the case if the water tank 210 is empty, if the dust extractor suffers from malfunction, or if the auxiliary device has run out of battery power and is unable to function as intended.

According to an alternative, the control unit 150 is arranged to receive an acknowledgement signal from the auxiliary equipment 200, and to only allow actuation of the trigger 110 by the user if an acknowledgement signal is received in response to transmitting the wireless activation signal. This procedure does not involve the first and second positions of the lockout mechanism, but still prevents the user from activating the trigger until the auxiliary device has acknowledged the activation signal. This feature advantageously prevents use of the construction equipment if the auxiliary equipment is not operating properly.

As mentioned above, a user interface 160 such as a display or LED light on the construction equipment and/or on the auxiliary equipment can be used to indicate that the wireless activation signal has been successfully transmitted and received, and that the auxiliary equipment is performing the intended function. The same interface can of course also be used to indicate malfunction in the system, for instance the lack of an acknowledgement indicating successful reception by the auxiliary equipment of the wireless activation signal.

According to an example, a cut-off tool may transmit an activation signal to an air cleaner which has suffered a malfunction and is not able to clean the air at a work site in a satisfactory manner. The air cleaner, having detected this malfunction, will not respond to the activation signal with an acknowledgement signal. It may either refrain from transmitting a signal back to the construction equipment, or it can transmit some form of error signal. The control unit of the construction equipment, having failed to receive an acknowledgement or having received the error signal, will then not allow use of the machine. Instead, it may indicate the auxiliary device malfunction condition via the user interface 160.

The control unit 150 is optionally also arranged to respond to a repeated actuation of the trigger lockout arrangement 120 within a time period, by performing a pre-determined function. This repeated actuation can, e.g., be a double-click actuation or a triple-click actuation, where a user presses the trigger lockout device repeatedly a pre-determined number of times, such as two or three times, within a relatively short time window, such as a time window of two or three seconds. The pre-determined function can for instance be an un-pairing operation where a logical link to one or more auxiliary devices is removed, or a test routine configured to test wireless connectivity to the auxiliary device and function thereof. This way the trigger lockout mechanism can be used for yet another function. The action can advantageously be complemented by information displayed to the user via the user interface 160, which can display messages such as "pairing successful", "un-pairing completed", "no acknowledgement from paired equipment", "error in auxiliary device", and so on.

It is appreciated that the pairing function of the trigger lockout arrangement discussed above is not inextricably linked with the auxiliary device activation function, but can also be used as a stand-alone function separate from the auxiliary device activation function. Thus, there is also disclosed herein hand-held construction equipment 100 comprising a trigger 110 arranged to activate the equipment 100 in response to actuation by a user, a trigger lockout arrangement 120 having a locked state and a released state, where the trigger lockout arrangement 120 is arranged to prevent activation of the construction equipment, i.e., prevent actuation of the trigger 110 by the user, when in the locked state, and a control unit 150 comprising a communications module arranged to communicate wirelessly 170 with auxiliary equipment 200. The control unit 150 is associated with a paired state and an unpaired state, where the control unit, when in the unpaired state, is arranged to perform a pairing operation in response to the trigger lockout arrangement 120 entering into the released state. Thus, a user may, for instance, pair a power cutter or some other form of hand-held construction equipment with one or more auxiliary devices by depressing the trigger lockout and at the same time activating a pairing function on the auxiliary device, which can often be done by a special pairing button or via some form of menu selection.

Some hand-held construction equipment comprises one or more work lights (not shown in the Figures) arranged to light up a work site, or at least part of a work object to be processed by the construction equipment. The work light can be arranged on the machine itself, or be separate from the machine, e.g., as a headlight, possibly mounted to a construction site protective helmet and wirelessly connected to the control unit. According to some aspects, the control unit 150 is arranged to activate one or more such work lights of the construction equipment 100 in response to the trigger lockout arrangement 120 entering into the released state. According to one example, the work light has at least two light intensities and/or at least two light beam widths. The work light activation may then comprise reconfiguring the work light from a low or medium light intensity operation to a more powerful light intensity mode of operation. The work light activation may also comprise reconfiguring the work light from a more wide beam operation to a more narrow beam operation, which more clearly lights up the part of the work object to be processed by increased light focus, while the more wide beam operation gives a better overview of the work object and the work area. By adjusting intensity and/or light beam width, the work light consumes less power, which is a particular advantage if the construction equipment is battery powered. An operator which is about to start processing of a work object operates the trigger lock-out arrangement to release the trigger in order to activate the equipment, and then at the same time activates the work light. This way the work light is not used more than necessary, at least not in the high intensity and/or focused light beam mode of operation.

It is appreciated that this work light activation functionality is independent from the other functions of the trigger lockout arrangement 120 discussed herein, although combinations of the different functions result in particular advantages. Consequently, hand-held construction equipment 100 is disclosed herein which comprises a trigger 110 arranged to activate the equipment 100 in response to actuation by a user, a trigger lockout arrangement 120 having a locked state and a released state, where the trigger lockout arrangement 120 is arranged to prevent activation of the construction equipment, i.e., prevent actuation of the trigger 110 by the user, when in the locked state, and a control unit 150 arranged to activate a work light of the construction equipment 100 in response to the trigger lockout arrangement 120 entering into the released state.

Figure 5:
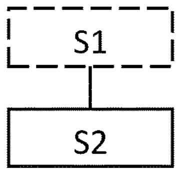
FIG. 5 is a flow chart illustrating methods.

The techniques discussed above can also be seen as a method performed by hand-held construction equipment 100, which is illustrated by the flow chart in FIG. 5. The hand-held construction equipment 100 comprises a trigger 110 arranged to activate the equipment 100 in response to actuation by a user and a trigger lockout arrangement 120 having a locked state and a released state. The trigger lockout arrangement 120 is arranged to prevent activation of the construction equipment, i.e., prevent actuation of the trigger 110 by the user, when in the locked state. There is also a control unit 150 comprising a communications module arranged to communicate wirelessly 170 with auxiliary equipment 200. The method comprising transmitting S2 a wireless activation signal by the communications module to the auxiliary equipment 200 in response to the trigger lockout arrangement 120 entering into the released state. According to some aspects, the control unit 150 is associated with a paired state and an unpaired state, and the method further comprises, when the control unit is in the unpaired state, performing S1 a pairing operation in response to the trigger lockout arrangement 120 entering into the released state.

Figure 6:
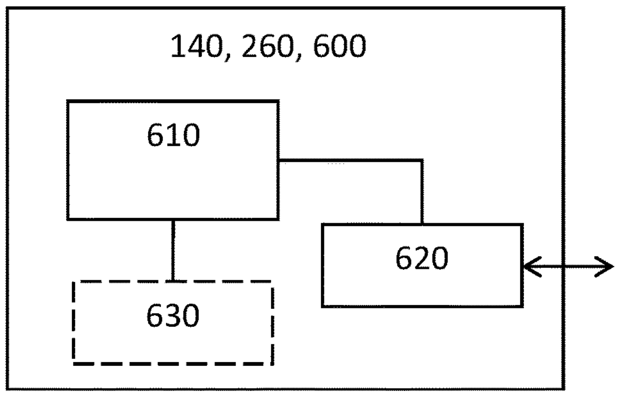
FIG. 6 schematically illustrates a control unit.

FIG. 6 schematically illustrates, in terms of a number of functional units, the general components of a control unit 140, 260, 600. Processing circuitry 610 is provided using any combination of one or more of a suitable central processing unit CPU, multiprocessor, microcontroller, digital signal processor DSP, etc., capable of executing software instructions stored in a computer program product, e.g. in the form of a storage medium 630. The processing circuitry 610 may further be provided as at least one application specific integrated circuit ASIC, or field programmable gate array FPGA.

Particularly, the processing circuitry 610 is configured to cause the device 140, 260, 600 to perform a set of operations, or steps, such as the methods discussed in connection to FIG. 5 and the discussions above. For example, the storage medium 630 may store the set of operations, and the processing circuitry 610 may be configured to retrieve the set of operations from the storage medium 630 to cause the device to perform the set of operations. The set of operations may be provided as a set of executable instructions. Thus, the processing circuitry 610 is thereby arranged to execute methods as herein disclosed.

The storage medium 630 may also comprise persistent storage, which, for example, can be any single one or combination of magnetic memory, optical memory, solid state memory or even remotely mounted memory.

The device 110 may further comprise an interface 620 for communications with at least one external device. As such the interface 620 may comprise one or more transmitters and receivers, comprising analogue and digital components and a suitable number of ports for wireline or wireless communication.

The processing circuitry 610 controls the general operation of the control unit 140, 260, 600, e.g., by sending data and control signals to the interface 620 and the storage medium 630, by receiving data and reports from the interface 620, and by retrieving data and instructions from the storage medium 630.

Figure 7:
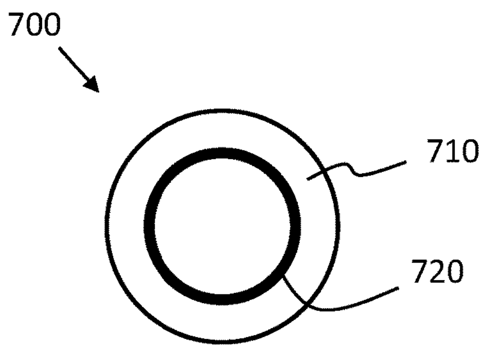
FIG. 7 schematically illustrates a computer program product.

FIG. 7 illustrates a computer readable medium 710 carrying a computer program comprising program code means 720 for performing the methods illustrated in FIG. 5, when said program product is run on a computer. The computer readable medium and the code means may together form a computer program product 700.

The invention claimed is:

1. Hand-held construction equipment comprising a trigger arranged to activate the equipment in response to actuation by a user, a trigger lockout arrangement having a locked state and a released state, wherein the trigger lockout arrangement is arranged to prevent activation of the construction equipment by the user when in the locked state, and a control unit comprising a communications module arranged to communicate wirelessly with auxiliary equipment, wherein the control unit is arranged to transmit a wireless activation signal by the communications module to the auxiliary equipment in response to the trigger lockout arrangement entering into the released state or in response to the trigger lockout arrangement entering into the released state and remaining in the released state for a predetermined period of time.

2. The hand-held construction equipment according to claim 1, wherein the trigger is a trigger on a cut-off tool, and where the trigger lockout arrangement comprises a button arranged to be actuated by the palm of a user gripping a rear handle of the cut-off tool.

3. The hand-held construction equipment according to claim 2, wherein the auxiliary equipment comprises a water tank with a pump comprising a control unit arranged to activate the pump in response to receiving the wireless activation signal, or wherein the auxiliary equipment comprises a dust extractor with a control unit arranged to activate the dust extractor in response to receiving the wireless activation signal.

4. The hand-held construction equipment according to claim 1, wherein the control unit is arranged to transmit a wireless deactivation signal by the communications module to the auxiliary equipment in response to the trigger lockout arrangement entering into the locked state or in response to the trigger lockout arrangement entering into the locked state and remaining in the locked state for a predetermined period of time.

5. The hand-held construction equipment according to claim 1, wherein the trigger lockout arrangement is arranged to allow actuation of the trigger by the user when in the released state.

6. The hand-held construction equipment according to claim 1, wherein the released state of the trigger lockout arrangement comprises a first position and a second position, wherein the control unit is arranged to transmit the wireless activation signal in response to the trigger lockout arrangement entering into the first position of the released state or in response to the trigger lockout arrangement entering into the first position of the released state and remaining in the first position of the released state for a predetermined period of time, wherein the control unit is arranged to allow transition by the trigger lockout arrangement into the second position of the released state in response to receiving an acknowledgement signal from the auxiliary equipment, wherein the trigger lockout arrangement is configured to prevent activation of the construction equipment by the user in the first position of the released state and to allow activation of the construction equipment in the second position of the released state.

7. The hand-held construction equipment according to claim 1, wherein the control unit is arranged to receive an acknowledgement signal from the auxiliary equipment, and to only allow actuation of the trigger by the user if an acknowledgement signal is received in response to transmitting the wireless activation signal.

8. The hand-held construction equipment according to claim 1, wherein the control unit is arranged to control a user interface of the construction equipment to indicate by the user interface if the trigger lockout arrangement is in the locked state or in the released state.

9. The hand-held construction equipment according to claim 1, wherein the control unit is associated with a paired state and an unpaired state, wherein the control unit, when in the unpaired state, is arranged to perform a pairing operation in response to the trigger lockout arrangement entering into the released state or in response to the trigger lockout arrangement entering into the released state and remaining in the released state for a predetermined period of time.

10. The hand-held construction equipment according to claim 1, wherein the control unit is arranged to respond to a repeated actuation of the trigger lockout arrangement within a time period, by performing a pre-determined function.

11. The hand-held construction equipment according to claim 10, wherein the pre-determined function is an unpairing operation or a test routine configured to test wireless connectivity to the auxiliary device and function thereof.

12. The hand-held construction equipment according to claim 1, wherein the control unit is arranged to activate a work light of the construction equipment in response to the trigger lockout arrangement entering into the released state or in response to the trigger lockout arrangement entering into the released state and remaining in the released state for a predetermined period of time.

13. The hand-held construction equipment according to claim 1, wherein the trigger lockout arrangement comprises a dissimilar action type mechanism.

14. The hand-held construction equipment according to claim 1, wherein the control unit is arranged to define a reconfigurable logical link to the auxiliary equipment prior to transmitting the wireless activation signal.

15. A method performed by hand-held construction equipment, where the hand-held construction equipment comprises a trigger arranged to activate the equipment in response to actuation by a user, a trigger lockout arrangement having a locked state and a released state, where the trigger lockout arrangement is arranged to prevent activation of the construction equipment by the user when in the locked state, and a control unit comprising a communications module arranged to communicate wirelessly with auxiliary equipment, the method comprising transmitting a wireless activation signal by the communications module to the auxiliary equipment in response to the trigger lockout arrangement entering into the released state or in response to the trigger lockout arrangement entering into the released state and remaining in the released state for a predetermined period of time.

16. The method according to claim 15, where the control unit is associated with a paired state and an unpaired state, the method further comprising, when the control unit is in the unpaired state, performing a pairing operation in response to the trigger lockout arrangement entering into the released state or in response to the trigger lockout arrangement entering into the released state and remaining in the released state for a predetermined period of time.

17. Hand-held construction equipment comprising a trigger arranged to activate the equipment in response to actuation by a user, a trigger lockout arrangement having a locked state and a released state, where the trigger lockout arrangement is arranged to prevent activation of the construction equipment by the user when in the locked state, and a control unit comprising a communications module arranged to communicate wirelessly with auxiliary equipment, where the control unit is associated with a paired state and an unpaired state with respect to the auxiliary equipment, where the control unit, when in the unpaired state, is arranged to perform a pairing operation in response to the trigger lockout arrangement entering into the released state or in response to the trigger lockout arrangement entering into the released state and remaining in the released state for a predetermined period of time.

18. The hand-held construction equipment according to claim 17, where the control unit is arranged to respond to a repeated actuation of the trigger lockout arrangement within a time period, by performing a pre-determined function.

19. The hand-held construction equipment according to claim 18, where the pre-determined function is an un-pairing operation.

20. The hand-held construction equipment according to claim 18, where the pre-determined function is a test routine configured to test wireless connectivity to the auxiliary device and function thereof.

* * * * *